(12) United States Patent
Bloesch et al.

(10) Patent No.: US 8,145,673 B2
(45) Date of Patent: Mar. 27, 2012

(54) EASILY QUERIABLE SOFTWARE REPOSITORIES

(75) Inventors: Anthony C. Bloesch, Vashon, WA (US); Dennis W. Minium, Sammamish, WA (US); Keith W. Short, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 11/749,616

(22) Filed: May 16, 2007

(65) Prior Publication Data

US 2008/0201355 A1 Aug. 21, 2008

Related U.S. Application Data

(63) Continuation-in-part of application No. 11/676,170, filed on Feb. 16, 2007.

(51) Int. Cl.
*G06F 7/00* (2006.01)
*G06F 17/30* (2006.01)
(52) U.S. Cl. ......... 707/796; 707/736; 707/737; 707/790
(58) Field of Classification Search ................ 707/4, 10, 707/100, 203, 736, 737, 790, 796
See application file for complete search history.

(56) References Cited

U.S. PATENT DOCUMENTS

| | | | |
|---|---|---|---|
| 5,581,755 A | 12/1996 | Koerber et al. | |
| 5,737,591 A | 4/1998 | Kaplan | |
| 5,878,432 A | 3/1999 | Misheski et al. | |
| 5,950,209 A | 9/1999 | Carrier, III et al. | |
| 5,978,811 A | 11/1999 | Smiley | |
| 6,038,393 A | 3/2000 | Lyengar | |
| 6,167,405 A | 12/2000 | Rosensteel | |
| 6,173,439 B1 | 1/2001 | Carlson | |
| 6,240,416 B1 | 5/2001 | Immon et al. | |
| 6,381,743 B1 | 4/2002 | Mitschler | |
| 6,460,052 B1 * | 10/2002 | Thomas et al. | 707/203 |
| 6,532,588 B1 | 3/2003 | Porter | |
| 6,578,037 B1 | 6/2003 | Wong et al. | |
| 6,598,219 B1 | 7/2003 | Lau | |
| 6,662,188 B1 | 12/2003 | Rasmussen | |

(Continued)

OTHER PUBLICATIONS

Andre Van Der Hoek, et al., "A Generic, Peer-to-Peer Repository for Distributed Configuration Management," Software Engineering Research Laboratory, Department of Computer Science, University of Colorado, Boulder, Colorado. 1999 IEEE Proceedings of ICSE-18, available at http://delivery.acm.org/10.1145/230000/227786/p308-van_der_hoek.pdf?key1=227786&key2=1334925611&coll=GUIDE&dl=GUIDE&CFID=8075646&CFTOKEN=65412344 (PDF enclosed entitled "Document 1," 10 pgs.).

(Continued)

*Primary Examiner* — Wilson Lee
*Assistant Examiner* — Cheryl M Shechtman
(74) *Attorney, Agent, or Firm* — Workman Nyedegger

(57) ABSTRACT

In one embodiment, tables are created in such a way that allows rich querying using standard database routines and other tools. This is accomplished by providing developers and repository users with a set of schema guidelines that describe how the software related items are to be categorized in the tables and how to use such tables for rich querying. For example, one such guideline provides for course-grained versioning of items (e.g., artifacts, metadata, etc.)—as opposed to the fine grained object principle of unit change found in most repository systems such as the entity-property-value scheme. The developers or providers then use these guidelines to optimally categorize, in a natural way, their metadata and other software related items for storing copies thereof in the repository.

16 Claims, 8 Drawing Sheets

U.S. PATENT DOCUMENTS

| | | | |
|---|---|---|---|
| 6,681,382 | B1 | 1/2004 | Kakumani et al. |
| 6,745,332 | B1 | 6/2004 | Wong et al. |
| 6,874,146 | B1 | 3/2005 | Lyengar |
| 6,920,458 | B1 | 7/2005 | Chu et al. |
| 6,959,326 | B1 | 10/2005 | Day |
| 6,978,281 | B1 | 12/2005 | Kruy et al. |
| 6,996,558 | B2 * | 2/2006 | Dettinger et al. .................. 707/4 |
| 7,028,057 | B1 | 4/2006 | Vasudevan et al. |
| 7,076,496 | B1 | 7/2006 | Ruizandrade |
| 7,120,898 | B2 | 10/2006 | Grover et al. |
| 7,133,871 | B2 | 11/2006 | Sluiman |
| 7,143,091 | B2 | 11/2006 | Charnock et al. |
| 7,146,606 | B2 | 12/2006 | Mitchell |
| 7,155,703 | B2 | 12/2006 | Meijer et al. |
| 7,168,063 | B2 | 1/2007 | Meijer |
| 7,213,037 | B2 | 5/2007 | Rangadass |
| 7,349,913 | B2 | 3/2008 | Clark et al. |
| 7,350,172 | B1 | 3/2008 | Koh |
| 7,383,255 | B2 | 6/2008 | Desai |
| 7,558,781 | B2 * | 7/2009 | Probst et al. ....................... 707/3 |
| 7,783,763 | B2 | 8/2010 | Tuel |
| 2002/0087665 | A1 | 7/2002 | Marshall |
| 2002/0184194 | A1 | 12/2002 | Yoon |
| 2002/0198873 | A1 | 12/2002 | Chu-Carroll |
| 2003/0079107 | A1 | 4/2003 | Booth |
| 2003/0225768 | A1 * | 12/2003 | Chaudhuri et al. ............. 707/10 |
| 2004/0010776 | A1 | 1/2004 | Shah |
| 2004/0088578 | A1 | 5/2004 | Chao et al. |
| 2004/0167899 | A1 | 8/2004 | Patadia |
| 2004/0167920 | A1 | 8/2004 | Owen |
| 2004/0186836 | A1 | 9/2004 | Schlesinger |
| 2004/0193594 | A1 | 9/2004 | Moore |
| 2004/0193912 | A1 | 9/2004 | Li et al. |
| 2004/0199867 | A1 | 10/2004 | Brandenborg |
| 2005/0044089 | A1 | 2/2005 | Wu |
| 2005/0050053 | A1 | 3/2005 | Thompson |
| 2005/0050084 | A1 | 3/2005 | Atm |
| 2006/0026168 | A1 | 2/2006 | Bosworth |
| 2006/0041661 | A1 | 2/2006 | Erikson |
| 2006/0112129 | A1 | 5/2006 | Kostojohn |
| 2007/0055680 | A1 | 3/2007 | Statchuk |
| 2007/0073673 | A1 | 3/2007 | McVeigh et al. |
| 2007/0073776 | A1 | 3/2007 | Kalalian et al. |
| 2007/0156687 | A1 | 7/2007 | Idicula et al. |
| 2007/0192374 | A1 | 8/2007 | Abnous |
| 2007/0203925 | A1 | 8/2007 | Sandler |
| 2007/0208744 | A1 | 9/2007 | Krishnaprasad et al. |
| 2007/0255677 | A1 | 11/2007 | Alexander |
| 2007/0276851 | A1 | 11/2007 | Friedlander et al. |
| 2008/0098349 | A1 | 4/2008 | Lin |
| 2008/0163332 | A1 | 7/2008 | Hanson |
| 2008/0177692 | A1 | 7/2008 | Bloesch |
| 2008/0201330 | A1 | 8/2008 | Bloesch |
| 2008/0320377 | A1 | 12/2008 | Seetharamakrishnan et al. |
| 2010/0325170 | A1 | 12/2010 | Bloesch |

OTHER PUBLICATIONS

Philip A. Bernstein, et al., "Microsoft Repository Version 2 and the Open Information Model," Microsoft Corporation, One Microsoft Way, Redmond, Washington, available at https://research.microsoft.com/~philbe/Info%20Sys%20on%20MS%20Repository%20for%20Web.pdf (PDF enclosed entitled Document 2, 27 pgs.).

Edward Sciore, "Versioning and Configuration Management in an Object-Oriented Data Model," VLDB Journal, 3, 77-106, 1994, available at http://www.vldb.org/journal/VLDBJ3/P077.pdf (PDF enclosed entitled "Document 3" 30 pgs.).

Microsoft SOA & Business Process, "Oslo", 2007, 1 page.

MSDN, "Oslo" Repository Architecture, 2009, 23 pages.

Tangsripairoj, Songsri, et al., "Organizing and Visualizing Software Repositories Using the Growing Hierarchical Self-Organizing Map", Journal of Information Science and Engineering 22, 283-295 (2006), Nov. 2005, pp. 283-295.

Rose, Thomas, et al., "Organizing Software Repositories Modeling Requirements and Implementation Experiences", 1992 IEEE, pp. 31-38.

Macchini, Bruno, Reusing Software with ESTRO (Evolving Software Repository), 1992 IEEE, pp. 150-157.

Petro, James, et al., "Model-Based Reuse Repositories—Concepts and Experience", 1995 IEEE, pp. 60-69.

Office Action dated Dec. 17, 2008 cited in U.S. Appl. No. 11/676,170.

Aske Simon Christensen, Anders Moller and Michael I. Schwartzbach, University of Aarhus, Denmark, "Extending Java for High-Level Web Service Construction," [online] ACM Transactions on Programming Languages and Systems, vol. 25, No. 6, Nov. 2003, [retrieved on Dec. 4, 2006], pp. 814-875. Retrieved from the Internet: http://delivery.acm.org/10.1145/950000/945890/p814-s_christensen.pdf?key1=945890&key2=3681925611&coll=ACM&dl=ACM&CFID=75919783&CFTOKEN=92791909.

Neil et al., "A Study of Usability of Web-Based Software Repositories" in: IEEE Software Methods and Tools 2000, Nov. 2000, pp. 51-58.

Related U.S. Appl. No. 11/749,607, filed May 16, 2007 (Not Yet Published).

Viewpoints: A Framework for Integrating Multiple Perspectives in System Development, A. Finkelsetin, J. Kramer, B. Nuseibeh, L. Finkelstein, M. Goedicke, http://www.cs.ucl.ac.uk/staff/A.Finkelstein/papers/ijseke92.pdf (27 pages).

A Framework for Expressing the Relationship Between Multiple Views in Requirements Specification, Bashar Nuseibeh, Jeff Kramer, Anthony Finkelstein, Oct. 1994, http://www.cs.ucl.ac.uk/staff/A.Finkelstein/papers/tse94.icse.pdf (20 pages).

Using Multiple Representations Within a Viewpoint, Nigel James Stranger, Nov. 30, 1999, http://eprints.otago.ac.nz/26/01/Thesis.pdf (496 pages).

Pierre-Alain Muller, Franck Fleurey, Didier Vojtisek, Zoe Drey, Damien Pollet, Frederic Fondement, Philippe Studer and Jean-Marc Jezequel, "On Executable Meta-Languages applied to Model Transformations," [online] Date Unknown, [retrieved on Dec. 4, 2006], pp. 1-48. Retrieved from the Internet: http://www.irisa.fr/triskell/publis/2005/Muller05c.pdf.

Branko Milosavljevic, Milan Vidakovic, Srdjan Komazec and Gordana Milosavljevic, Faculty of Engineering, University of Novi Sad, Yugoslavia "User Interface Code Generation for EJB-Based Data Models Using Intermediate From Representations," [online] Copyright 2003, PPPJ Jun. 16-18, 2003, Kilkenny City, Ireland, [retrieved on Dec. 4, 2006], pp. 125-128. Retrieved from the Internet: http://delivery.acm.org/10.1145/960000/957327/p125-milosavljevic.pdf?key1=957327&key2=4411925611&coll=GUIDE&dl=GUIDE&CFID=75919783&CFTOKEN=92791909.

Neel Sundaresan and Reshad Moussa, NehaNet Corp., San Jose, California, "Algorithms and Programming Models for Efficient Representation of XML for Internet Applications," [online] WWW10, May 1-5, 2001, [retrieved on Dec. 4, 2006], pp. 366-375. Retrieved from the Internet: http://delivery.acm.org/10.1145/380000/372090/p366-sundaresan.pdf?key1=372090&key2=4204925611&coll=ACM&dl=ACM&CFID=75919783&CFTOKEN=92791909.

Weinberger, Ellis, et al., "A security policy for a digital repository", Oct. 2002, 5 pages.

Bustamente, Michele Leroux, "Building a Claims-Based Security Model in WCF", The ServerSide .NET Your Enterprise .NET Community, Mar. 28, 2007, 10 pages.

Worboys, Geoff, et al., "Firebird File and Metadata Security", Dec. 7, 2005, Document version 0.5, 12 pages.

U.S. Appl. No. 12/112,773, filed Apr. 30, 2008 (Not Yet Published).

Venkatrao, SQL/CLI A New Binding Style for SQL, SIGMOD Record, vol. 24, No. 4, Dec. 1995, pp. 72-77.

Office Action dated Jul. 21, 2009 cited in U.S. Appl. No. 11/676,170.

Office Action dated Aug. 19, 2009 cited in U.S. Appl. No. 11/749,607.

Office Action dated Jan. 19, 2010 cited in U.S. Appl. No. 11/626,815.

Ort and Bhakti, Java Architecture for XML Binding, Mar. 2003, pp. 1-12.

McCluskey, Using Java Reflection, Jan. 1998, 99. 1-8.

Haggar, Java Bytecode: Understanding Bytecode Makes You a Better Programmer, Jul. 1, 2001, pp. 1-9.

U.S. Appl. No. 11/749,607, Mar. 9, 2010, Office Action.
U.S. Appl. No. 11/626,815, Jul. 23, 2010, Office Action.
"What's on the CD?", O'Reilly VB .NET Core Classes in a Nutshell for Visual Studio .NET version 1.0, 2002, pp. 1-6.
U.S. Appl. No. 11/749,607, Aug. 30, 2010, Notice of Allowance.
U.S. Appl. No. 12/489,245, filed Jun. 22, 2009, Anthony C. Bloesch.
U.S. Appl. No. 12/112,773, Sep. 16, 2011, Notice of Allowance.
U.S. Appl. No. 12/489,245, Sep. 29, 2011, Notice of Allowance.
U.S. Appl. No. 12/112,773, May 10, 2011, Office Action.

* cited by examiner

EASILY QUERIABLE SOFTWARE REPOSITORIES

CROSS-REFERENCE TO RELATED APPLICATIONS

This application is a continuation-in-part and claims priority to and the benefit of currently pending U.S. patent application Ser. No. 11/676,170 filed Feb. 16, 2007 and entitled "SOFTWARE REPOSITORY", the contents of which are incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

Software code is typically written by one or more software developers using some type of integrated development environment (IDE). In many cases, developers are given a set of design instructions, and, using a programming language, draft software code that will implement the functions described in the design specifications. Depending on the nature and scope of the design specifications (or any subsequent modifications thereto), the software program can be both large and complex.

Enterprise software programs, for example, may involve many hundreds or thousands of software files, each file designed to interact with other files within the program and externally with other software programs and/or operating systems. Often, supplemental programs or databases, such as, for example, software repositories, are used to organize, search and maintain the metadata which describes the program and its files. Program metadata consists of information such as the structure of program components, behavior of those components, and other characteristics useful for organization and control. File metadata consists of information such as the date the file was last modified, the size of the file, the file's relation to other files within the software program, and other characteristics useful for organization and control.

One approach for organizing a software repository includes storing a software program's objects and their corresponding metadata together using an entity-property-value approach (also called the universal schema approach). Using an entity-property-value approach most data is stored in a table of property ID/value pairs. Thus, a software repository can be organized such that objects are listed alphabetically with the metadata alongside, each portion of metadata corresponding to the appropriate object. For example, a software repository can list a software object and a name and corresponding value for the each property of the software object. Related objects can be, for example, shown as a list of related objects headed by the kind of relationship (e.g., objects related to another object by an automatic generation process).

Using an entity-property-value approach data is stored in a highly uniform way making it relatively easy to build generic repository APIs and browsers. However, due to the (typically finer) granularity with which software objects are stored (i.e., per property), querying an entity-property-value based software repository can be complex and inefficient. Many objects can include additional relationships to one another (e.g., based on user-preference, code version, access patterns, replication, etc.) causing them to be frequently accessed together. However, these additional relationships are not easily represented using entity-property-value approach. Thus, although these objects are related in additional ways, they typically cannot be easily accessed as a group. Accordingly, queries may be required to access objects individually and then subsequently group them together for performing further operations.

Another approach for organizing a software repository includes storing metadata in XML columns or some other post-relational structure. As opposed to name/value pairs, post-relational structures permit complex data values to be stored in a single table cell. Because some database servers have efficient ways to store XML, an XML column or other post-relational approach can be efficient for hierarchical data (e.g., type definitions of an object oriented software program). Using a post-relational approach, hierarchical data can be flexibly grouped.

However, due to the (typically coarser) granularity with which software objects are stored (i.e., in a hierarchical tree), querying a post-relational based software repository can be also be complex and inefficient. For example, objects can be related in ways that don't conform well to a hierarchical structure (e.g., based on user-preference, code version, access patterns, replication, etc.) and thus related objects can span different hierarchical trees. Accordingly, queries may be required to access different sub-trees from different post-relational structures and then merge the results together for performing further operations.

Further, most database tools are designed for use with databases based on conventional schemas (as opposed to universal schema or post-relational) making their use with entity-property-value and post-relational based software repositories more difficult. As such, not only are these queries typically more complex, a developer must often resort to developing queries without the automated development capabilities included in these database tools. Accordingly, at the very least, creating software repository queries can consume significant developer resources (that would otherwise be used to develop code). In many cases, creating software repository queries will be beyond the technical expertise of a developer (that while trained in code development may lack expert knowledge in database queries).

BRIEF SUMMARY

The above-identified deficiencies and drawback of current repository systems are overcome through example embodiments of the present invention. For example, embodiments described herein provide for mechanisms that allow rich querying over software related items in a repository by storing query tables in accordance with schema guidelines that allow for such things as coursed grained versioning and soft linking of containers. Accordingly, the items in the repository are more easily reflected over as opposed to the universal entity-property-value schema that is versioned on an object-by-object basis Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for a method of providing entities the ability to optimally create, manage, and/or store fine-grained metadata, artifacts, or other software related items of a domain by providing a relational model that stores these items in a way that allows rich querying using standard database routines and other tools. In this embodiment, entities are provided with a set of schema guidelines that describe how software related items of a schematized model of a domain are to be categorized in query tables. Based on the set of schema guidelines, the entities are then allowed to arrange the software related items into query tables that provide ease in querying over the software related items (i.e. extension by convention). Note that such items typically reside in a universal entity-property-value schema that is versioned on an object-by-object basis. The query tables are then stored in a software repository, which is a common store that allows tools that use the software related items to be independent of any particular domain model.

A similar example embodiment provides for a method of optimally creating, managing, and/or storing fine-grained metadata, artifacts, or other software related items of a domain by providing a relational model that stores these items in a way that allows rich querying using standard database routines and other tools. In such embodiment, software related items are identified for a schematized model of a domain. Next, a set of schema guidelines are accessed, which describe how the software related items are to be categorized in query tables. Based on the set of schema guidelines, the software related items are arranged into query tables that provide ease in querying over the software related items. As previously noted, such software related items typically reside in a universal entity-property-value schema that is versioned on an object-by-object basis. The plurality of query tables are then categorized for storage in a software repository, which is a common store that allows tools that use the software related items to be independent of any particular domain model.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
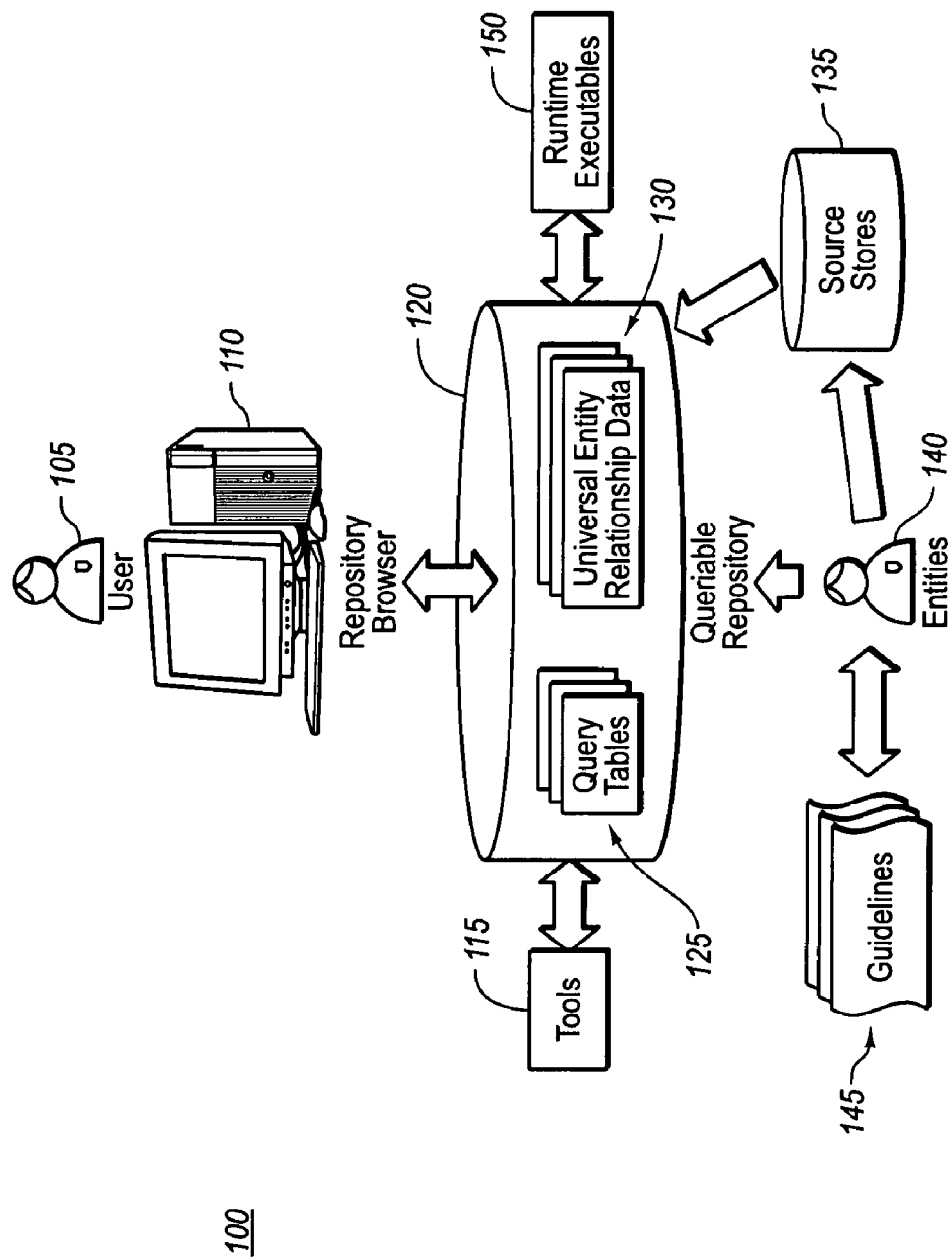
FIG. 1A illustrates an example computer architecture that uses repository guidelines to create, manage, and store query tables in accordance with example embodiments.

The present invention extends to methods, systems, computer program products, and data structures for software repositories. A computer system includes a software repository used to store software related items for a plurality of software units. The software repository includes a container version mapping for each deployable software unit. Each container version mapping includes a software unit field storing a software unit value that identifies the software unit, from among the plurality of software units. Each container version mapping also includes a container version ID field storing a container version identifier value. The container version ID is used within the software repository to identify a repository container version mapped to the software unit identified by the software unit value stored in the software unit field.

Overview

The software repository also includes a plurality of tables storing software related items by item type. Each table includes a plurality of rows of software related items corresponding to a specified item type. Each row includes a software related item data field storing software related data. In one embodiment, the tables are created in such a way that allows rich querying using standard database routines and other tools. This is accomplished by providing developers and repository users with a set of schema guidelines that describe how the software related items are to be categorized in the tables and how to use such tables for rich querying (i.e. extension by convention). For example, one such guideline provides for course-grained versioning of items (e.g., artifacts, metadata, etc.)—as opposed to the fine grained object principle of unit change found in most repository systems such as the entity-property-value scheme. The developers or providers then use these guidelines to optimally categorize, in a natural way, their metadata and other software related items for storing copies thereof in the repository.

Note that in some embodiments multiple versions of repository software items can be stored in the same repository. Further, as described in greater detail below, embodiments employ a pattern of "container versions" to describe the boundary of a collection of versioned software items. Thus, although the repository schema definitions defined by the guidelines are fine-grained in nature, versioning is performed on a cohesive collection of software items. Further, the repository uses a pattern for "soft linking" between containers. A "soft link" represents a relationship between two fine-grained objects that is not implemented as a primary key reference. Rather, the entity to which a soft link points is dynamically and algorithmically determined as needed. As such, models connected by soft links are loosely coupled. This is especially useful when two versioned containers are related to one another. Further note that the soft link can be expressed in such a way that the version is determined at query time.

Further note that each row in the tables created from the guidelines may also include a container version ID field storing a container version ID value from a container version mapping for a deployable software unit. The container version ID value designates that the software related data stored in the software related item data field corresponds to the repository container version that is mapped to the deployable software unit.

In some embodiments, software related items are stored in a software repository. A computer system accesses a software related item that is to be stored in the software repository. The computer system identifies a specified software unit, from among the plurality of software units, associated with the software related item. The computer system refers to a container version mapping to locate a repository container version that corresponds to the specified software unit.

The computer system retrieves a container version ID for the repository container version from the container version mapping. The computer system stores the software related item along with the container version ID in the software repository to indicate that the software related item is associated with the software unit. Accordingly, if the software repository is queried for software related items associated with the software unit, the software related item, as well as any other software related items stored along with the container version ID, are returned in response to the query.

In other embodiments, an operation is performed for a specified software unit. A computer system receives a command to perform a specified operation on a software unit. The computer system refers to a container version mapping to locate a repository container version that corresponds to the specified software unit. The computer system retrieves a container version ID for the repository container from the container version mapping.

The computer system queries the software repository for any software related items that are stored along with container version ID for the repository container version. The computer system receives references to a plurality of software related items from the software repository in response to the query. The computer system performs the specified operation on each software related item in the plurality of referenced software related items to perform the specified overall operation on the software unit.

Although more specific reference to advantageous features are described in greater detail below with regards to the Figures, embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or other communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The Queriable Repository

As previously mentioned, repositories have typically represented software items using an entity-property-value (also called universal entity-relationship) approach. In that approach, most data is stored in a single table of property ID-value pairs. This approach makes it easy to build generic repository APIs and browsers but at the cost of making queries both difficult to write and inefficient. Further, since the design of most database tools and APIs favor conventional schema, developers have typically found it difficult to use standard tools with these repositories.

Accordingly, example embodiments provide a repository that is a database system in which software items (e.g., metadata) for applications are collected, made easily queriable by interested parties and efficiently loadable by execution engines. More specifically, embodiments provide a set of guidelines that entities (such as developers, applications, etc.) can use to describe, categorize, manage, and/or store software items for their applications in easily queriable tables (i.e. extension by convention). FIG. 1A shows an example repository system that illustrates some of the concepts at the core of the queriable repository 120.

The repository 120 includes several pieces: first, it provides a store for fine-grained, schematized metadata from models produced by tools 115. Examples include forms and workflows described in XAML, metadata gleaned through reflection over assemblies, and system information stored as an application manifest of some sort. The schema for each of these different kinds of information is called, in repository terminology, a domain. Second, repository 120 provides a container for executable elements including ordinary executables (e.g., .dll's, exe's, etc.) and executable models that can be served up to various drivers. In any cases, the data or software items in the repository 120 are typically sourced from source stores 135 that are responsible for such items.

Although embodiments herein can still provide support for the universal entity-relationship data 130, example embodiments now provide guidelines 145 to entities 140 for developing query tables 125. Accordingly, the repository 120 can utilize a standard query language (e.g., Structure Query Language (SQL)) much like a database, which now allows any user 105, with the appropriate permissions, to access query tables 125 and stored procedures at will. Access to the queriable repository 120 may be made through ordinary, publicly available domain-specific APIs created using standard adjuncts to database management systems. For example, the repository browser 110 can exploit such APIs to present repository data or software items through a graphical UI.

As noted above, some of the fine-grained data or software items in the repository 120 may have a corresponding executable representation. For instance, assembly metadata might have a corresponding executable assembly. A XAML document describing a workflow can be compiled into an assembly, too. These executable bits can be loaded into the repository 120 as previously mentioned. Accordingly, when a runtime executable 150 needs to fire off an executable piece, it can consult the repository 130 using the rich query tables 125 and standard query expressions, pull out the executable, and hand it off to the appropriate run time to execute.

Since executable content can be served from the repository 120, one embodiment allows for storing execution statistics there as well for convenience purposes. This enables operations staff or others to monitor performance and to drive changes to the operational environment using the repository 120 as a resource. While operational tools will continue to use their own stores for describing configurations, publication of these descriptions into the repository offers a conceptually centralized, physically distributed place from which these descriptions can be discovered.

Multiple versions of repository 120 software related items can be stored in the same repository 120. As discussed in greater detail below with regard container specific guidelines 145, the queriable repository 120 can employ a guideline 145 that defines a pattern of "container versions" to describe the boundary of a collection of versioned software items (i.e., a set of objects as opposed to versioning on an object-by-object basis). Thus, although the query tables 125 include fine-grained objects, example embodiments provide for versioning on a cohesive collection of artifacts or software items. For example, such versioning could be based on the deployment of an application.

Further, other example guidelines 145 for the query repository 120 can use a pattern for "soft linking" between containers. A "soft link" represents a relationship between two fine-grained objects that is not implemented by primary key reference. Rather, the entity to which a soft link points is algorithmically determined as needed. Therefore, models connected by soft links are loosely coupled. This is especially useful when two versioned containers are related to one another. The soft link can be expressed in such a way that the version is determined at query time.

Note that although the guidelines 145 are typically used by entities 140 such as developers to manually construct and categorize software related items, these guidelines 145 can also be used by applications or similar entities 140 in an automated way. For example, code may be provided that gives suggestions to the developer 140 during development time based on the guidelines 145 or could have mechanisms that automatically implement the guidelines 145 as domains are created or reflected over. Of course, there may be any number of mechanisms for using the guidelines in an automated session; and therefore, any use of the guidelines in a manual or automated process is contemplated herein.

Guidelines

The following provides a list of some of the guidelines that may be used by developers for generating the query tables 125 used in the repository 120. Note that this list is not meant to be exhaustive and therefore, such listing is not meant to limit or otherwise narrow the scope of described embodiments. Further, the following description of the guidelines 145 may refer to one or more examples of pseudo code that may be used to implement one or more guidelines. Such pseudo code, however, is given for illustrative purposes only and is not meant to limit or otherwise narrow the scope of embodiments described herein. Moreover, as noted above, these guidelines 145 may be combined with existing schemas and practices, where such may provide adequate querying results.

Naming Guidelines

Consider using lower-case characters for standard query language (e.g., SQL) extension (e.g., Transact-SQL (T-SQL)) keywords. Lower-case characters are considered more legible than upper-case characters. Since many modern editors use special font faces and color coding to distinguish keywords, there may not be a need to distinguish keywords with uppercase in such things as T-SQL scripts.

Consider quoting identifiers with [ . . . ] style quotes. Quoted identifiers should not be misinterpreted as keywords thus making naming and name refactoring easier and more reliable.

Consider using schema qualified names to refer to database objects. Standard query extension languages (e.g., T-SQL) can dynamically bind names to database objects. To avoid, ambiguity qualified names should be used for database objects (e.g. [Clr].[Assembly]).

Consider using top level domain (e.g., .Net) naming conventions (e.g. meaningful names, Pascal casing for all public constructs and camel casing for all private constructs). Such naming conventions are becoming standard across numerous technologies and have several inherent advantages. For example, using .Net-naming conventions promotes consistency and correct default name mapping for object-relational mapping frameworks.

Consider using, e.g., [Id] as the name of the primary key (PK). Consistent primary key names make it easier to write join expressions in query language extensions (e.g., T-SQL) from clauses and handle tables generically.

Consider using plurals for table and view names. A table represents a collection of software related items, thus table names should be plural. This is also a convention of some servers that use standard query languages (e.g., SQL).

Consider appending Table to repository item table names. This allows security views to be created with natural names. For example, the base table [Clr].[AssembliesTable] and view [Clr].[Assemblies].

Consider using singular role names for join columns. Role names (e.g. [Employees].[Department]) refer to a single repository item and thus should be singular.

Consider using singular schema names. Schema names (e.g. [Workflow]) are analogous to top level domain (e.g., .Net) namespaces and, for consistency, should follow the same convention.

Consider explicitly naming constraints. Explicitly naming constraints allows developers and operations staff to refer to constraints consistently across repository instances. Otherwise, standard query (e.g., SQL) servers can generate an artificial name that may vary across repository instances.

Consider using a pattern similar to [PK_TableName] for primary-key names. Primary key names should be unique, within a schema, across all constraint names. Such a convention provides uniqueness and makes it easy for developers to refer to the primary key of a table.

Consider using a pattern similar to the following for check constraint names: [Check_TableName_Column1_Column2_Description]. Check clause names should be unique, within a schema, across constraint names. This convention assures uniqueness and makes it easy for developers to refer to a specific check clause. The following table gives a list of standard check constraint descriptions.

| Standard check constraint descriptions. | |
| --- | --- |
| Description | Constraint |
| NotEmpty | ... ≠ N'' |
| Nonnegative | ... ≧ 0 |
| Positive | ... > 0 |
| WithinRange | α ≦ ... ≦ β |

Consider using a pattern similar to the following for unique constraint names: [Unique_TableName_KeyColumn1_KeyColumn2]. Unique constraint names should be unique, within a schema, across all constraint names. This convention provides uniqueness and makes it easy for developers to refer to a unique constraint.

Consider using a pattern similar to the following for foreign key names: [FK_SourceTable_SourceColumn_TargetTableName]. Foreign key names should be unique, within a schema, across constraint names. This convention provides uniqueness and makes it easy for developers to refer to a foreign key.

Consider using a pattern similar to the following for relational index names: [IR_KeyColumn1_KeyColumn2_LeafColumn1]. Index names should be unique within a table. This convention provides uniqueness and makes it easy for developers to refer to an index.

Consider using a pattern similar to [IX_Column_Kind] for XML index names where Kind is one of: Primary, Value, Path or Property. Index names should be unique within a table. This convention provides uniqueness and makes it easy for developers to refer to an index.

Consider using a pattern similar to [Schema_Area] for full-text index catalog names. Full-text index catalog names should be unique within a database. This convention provides uniqueness and makes it easy for developers to refer to a full-text index catalog.

Consider using a separate schema for each domain. Schemas allow objects with the same name to be disambiguated. Since the number of domains in the repository can be dynamically extended the use of schemas removes the chance of a name collision.

Except for some company standard repository domains, consider using a pattern similar to [Company.Domain] for domain names. This should reduce the risk of a domain installation script failing because a schema with an identical name already exists.

Script File Guidelines

Consider using two script files per domain (one each for the public and private parts). Source code control systems now allow multiple developers to edit the same file and will automatically merge their changes. Using a small number of files per domain makes it easier for developers to make changes to a domain's script.

Schema Guidelines

Consider using extended properties to copyright and version label domains/schema. The following pseudo code illustrates one example of how to do this.

```
-- Copyright
execute sys.sp_addextendedproperty
@name = N'Copyright',
@value = N'© Microsoft Corporation 2006. All rights reserved.',
@level0Type = N'Schema', @level0Name = [CLR];
-- Schema version
execute sys.sp_addextendedproperty
@name = N'MajorVersion',
@value = 0,
@level0Type = N'Schema', @level0Name = [CLR];
execute sys.sp_addextendedproperty
@name = N'MinorVersion',
@value = 1,
@level0Type = N'Schema', @level0Name = [CLR];
execute sys.sp_addextendedproperty
@name = N'BuildVersion',
@value = 0,
@level0Type = N'Schema', @level0Name = [CLR];
execute sys.sp_addextendedproperty
@name = N'RevisionVersion',
@value = 0,
@level0Type = N'Schema', @level0Name = [CLR];
```

Table Guidelines

Consider using normalized table designs. Normalized tables scale well and simplify queries and updates.

Consider explicitly naming primary keys, foreign keys, and indexes. It is often necessary to refer to a primary keys, foreign keys and indexes by name. Explicitly naming them gives them a fixed name making it easier to write code that refers to them.

Consider using surrogate keys. In practice, natural keys have numerous problems: they are often not the unique identifiers they appear to be (e.g. Social Security Numbers, UPC numbers, ISBN numbers, etc.), they are often relatively large (thus reducing DBMS throughput) and do not evolve well over time. Surrogate (i.e., artificial) keys resolve these issues.

Consider using a class similar to BigInt type for identity columns of repository items where the ID may vary across repository instances. To allow the repository to scale out and geo-scale it is desirable to partition the identity values across servers. Unless the expected number of rows is small, the int type will not have enough values to support cross-server partitioning of IDs.

Consider using a class similar to UniqueIdentifier types ID columns of repository items where the ID may not vary across repository instances. UniqueIdentifiers are large but support scale out and geo-scaling. Where software is expected to need to refer to a repository item across repository instances (e.g. a specific repository container type), then UniqueIdentifiers are an appropriate choice for the ID.

Consider vertically partitioning large or infrequently accessed columns into separate tables. Appropriate vertical partitioning reduces the row size for most queries thus increasing throughput.

Consider using explicit integrity constraints. The repository should be updated from many sources directly. Explicit integrity constraints will provide the consistency of the repository even in the presence of developer error.

Consider using XML columns based on a schema collection for hierarchical or ordered data that will usually be fetched as a unit (e.g. method parameters). Relational structures perform poorly for this type of data. Using XML columns increases both the performance and usability of the repository.

Consider adding a container version column called, e.g., [ContainerVersion] to each domain table. To support scale-out and scale-up the repository needs to be easily horizontally partitionable. Since most queries will operate within a single container version the container version forms an ideal partitioning value.

Repository security is based on container versions. Having the container version available on each row can reduce the overhead of security since fewer joins are required.

Consider adding a tombstone table, and associated delete trigger, called, e.g., [TableNameDeleted] for each domain table. To support change tracking a tombstone table should be used to track repository items that have changed. The table can follow the scheme provided in the pseudo code below:

```
create table [Clr].[AssembliesDeleted]
(
    [Id]              [Clr].[Id] not null primary key clustered,
    [ContainerVersion] [Item].[ContainerVersionId] not null,
    [TimeStamp]       timestamp not null constraint
[Unique_AssembliesDeleted_TimeStamp] unique
);
execute sys.sp_addextendedproperty
    @name = N'RemoveOldItems', @value = N'Default',
    @level0Type = N'Schema', @level0Name = [Clr],
    @level1Type = N'Table', @level1Name = [AssembliesDeleted];
go
create trigger [Clr].[Assemblies_Record_Delete] on
[Clr].[AssembliesTable] for delete as
    insert into [Clr].[AssembliesDeleted] ([Id], [ContainerVersion])
        select [Id], [ContainerVersion] from deleted;
go
```

Consider using an attribute similar to xml:lang for XML entities including culture specific content. The xml:lang attribute is used by full-text indexes and other technologies to provide locale specific functionality.

Consider avoiding using string types for enumerations. String types are usually relatively large (thus reducing Database Management Systems (DBMS) throughput). However, human readable formats are useful for debugging and ad hoc query scenarios. Instead of a string based column type base the enumeration on the smallest suitable integer type and create a human readable computed column. For example:

```
[Access]      tinyint not null check([Access] between 0 and 6),
[AccessName] as (case [Access]   when 0 then N'compiler controlled'
                                 when 1 then N'private'
                                 when 2 then N'family and assembly'
                                 when 3 then N'assembly'
                                 when 4 then N'family'
                                 when 5 then N'family or assembly'
                                 when 6 then N'public'
    end),
```

Consider storing locale specific text as references to a table similar to the [Locale].[Strings] table and retrieve the strings with the scalar function like [Locale].[GetString]. Such functions as the Strings table and GetString function can provide a uniform method for retrieving strings for a specific locale.

Consider not using text, ntext, or image column types. To support scale out and geo-scaling the repository can uses transactional replication. Updates to columns of type text, ntext or image may not be supported by transactional replication, use, e.g., varchar(max), nvarchar(max), varbinary (max) instead.

Consider restricting access to base tables to the loginless users, e.g., [RepositoryAdministrator] and [RepositoryService]. Impersonation and security views can be used as security mechanisms to allow finer-grained access control than standard query (e.g., SQL) servers natively provide. [RepositoryService], e.g., can be the standard account that the security views impersonate.

To automatically remove old rows from a table consider adding an extended property (e.g., the RemoveOldItems) and a table column (e.g., [TimeStamp]) column to the table. A standard query agent (e.g., SQL Agent) job regularly can run the a stored procedure (e.g., [Item].[RemoveOldItems]), which can remove old rows from tables with matching extended properties. The value should be the label for the minimum amount of time to retain the rows. A label such as N'Default' can be for the administrator selected default retention period. The extended property can be added with a scheme similar to the following:

```
execute sys.sp_addextendedproperty
    @name = N'RemoveOldItems', @value = N'Default',
    @level0Type = N'Schema', @level0Name = [Clr],
    @level1Type = N'Table', @level1Name = [AssembliesDeleted];
go
```

Index Guidelines

Consider indexing join columns. Example repository scenarios should require good read performance. When a join column has a large number of distinct values, indexing it can improve performance. If a join column has a high proportion of duplicate values, then indexing it is unlikely to improve performance.

Consider indexing foreign key columns. Example repository scenarios should require good read performance. When a foreign key column has a large number of distinct values, indexing it can improve performance. If a foreign key column has a high proportion of duplicate values, then indexing it is unlikely to improve performance.

Consider indexing columns that frequently appear in where clauses. Example repository scenarios should require good read performance. When a column appears often in a where clause and it has a large number of distinct values, an index can improve performance.

Consider adding leaf columns to indexes. Example repository scenarios should require good read performance. Covering indexes which contain the columns that a query uses can improve performance because the main table does not need to be read. Adding leaf columns to an existing index to turn it into a covering index for key queries can thus improve overall performance.

Consider not using index columns with a small number of distinct values. Columns with a small number of distinct values typically cannot be effectively used to improve read performance.

Consider creating a new full-text catalog for each group of related values. Full-text indexes typically perform best when their catalogs contain only related indexes.

View Guidelines

Consider not using schema binding. By preventing others from adding columns to existing tables, schema binding can reduce the extensibility of the repository.

Consider creating security views. Security views allow users to transparently access the data they are authorized to see as if it were the entire set of data.

Procedure and Function Guidelines

Consider using updatable views instead of basic database functions (e.g., create, read, update, and delete (CRUD)) routines. Updatable views are considered more flexible and natural for a variety of tools. Error conditions should be signaled with exceptions.

Consider not using schema binding. By preventing others from adding columns to existing tables, schema binding can reduce the extensibility of the repository.

Consider avoiding cursors. Most cursor based code can be replaced by set oriented operations. Set operations scale-up well unlike cursor based code.

Consider not allowing update of primary key columns. Altering primary key columns can reduce opportunities for extensibility and can make replication more expensive. This can be achieved by careful design of the publically visible views and associated instead of triggers.

Consider not altering identity or timestamp columns. Transactional replication may not support updates to these columns.

Consider using column lists in insert statements. Transactional replication and other applications may add columns to a table. Insert statements with implicit column lists may then fail.

Foreign Keys Guidelines

Consider using delete triggers to enforce non-primary cascade delete actions with, e.g., name [CascadeDeleteTrigger_SourceTable_TargetTable_Column]. Two foreign keys with cascade delete actions cannot target the same table thus it is sometimes necessary to enforce the referential action of a less frequently updated foreign key with a trigger. The foreign key can be added with a scheme similar to the following:

Trigger names should be unique, within a schema, across all database objects. This convention provides uniqueness and can make it easy for developers to refer to a trigger that enforces a referential action.

Query Guidelines

Consider using table aliases composed of the initial capital letters in the table's name. This convention can help developers quickly identify the base table in a qualified name. For example,

```
select distinct NT.[Id], types.[Module]
from [Clr].[NamespacesTable] as NT
    inner join [Clr].[ClassesOrInterfacesTable] as COIT on NT.[Id] =
COIT.[Namespace];
```

Consider using explicit join conditions (i.e. 'on' clauses) in queries. Explicit join conditions are considered clearer indications of intent than join conditions in a where clause.

Cursor Use Guidelines

Consider avoiding the use of cursors. Cursors typically do not scale well and usually perform poorly compared with set based extensible query languages (e.g., T-SQL). Cursors may be appropriate when generating dynamic structured query language (i.e., SQL) for maintenance operations.

If cursors are used, consider using a standard pattern for cursors, e.g., the following pattern:

```
declare theCursor cursor local fast_forward for
    ...;
open theCursor;
fetch theCursor
    into ...;
while @@fetch_status = 0
begin
    ...;
    fetch theCursor
        into ...;
end
close theCursor;
deallocate theCursor;
```

The use of the fast_forward flag can improve performance by reducing locking overhead. Closing and deallocating the cursor also improves performance and mitigates against dangling cursor vulnerabilities. The local flag also mitigates against dangling cursor vulnerabilities.

Example Use of Repository Guidelines

The following provides an example of how embodied guidelines can be used to categorize queriable tables as opposed to current universal entity-relational storage techniques. Note that this is a simplistic and incomplete analysis of embodiments describe herein and is used for illustrative purposes only and is not meant to limit or otherwise narrow the scope of such embodiments.

```
create trigger
[Clr].[CascadeDeleteTrigger_Assemblies_AssemblyReferences_Assembly] on
[Clr].[AssembliesTable] for delete as
    delete from [Clr].[AssemblyReferencesTable]
        from deleted
            where [Clr].[AssemblyReferencesTable].[Assembly] = deleted.[Id];
go
```

Figure 5A:
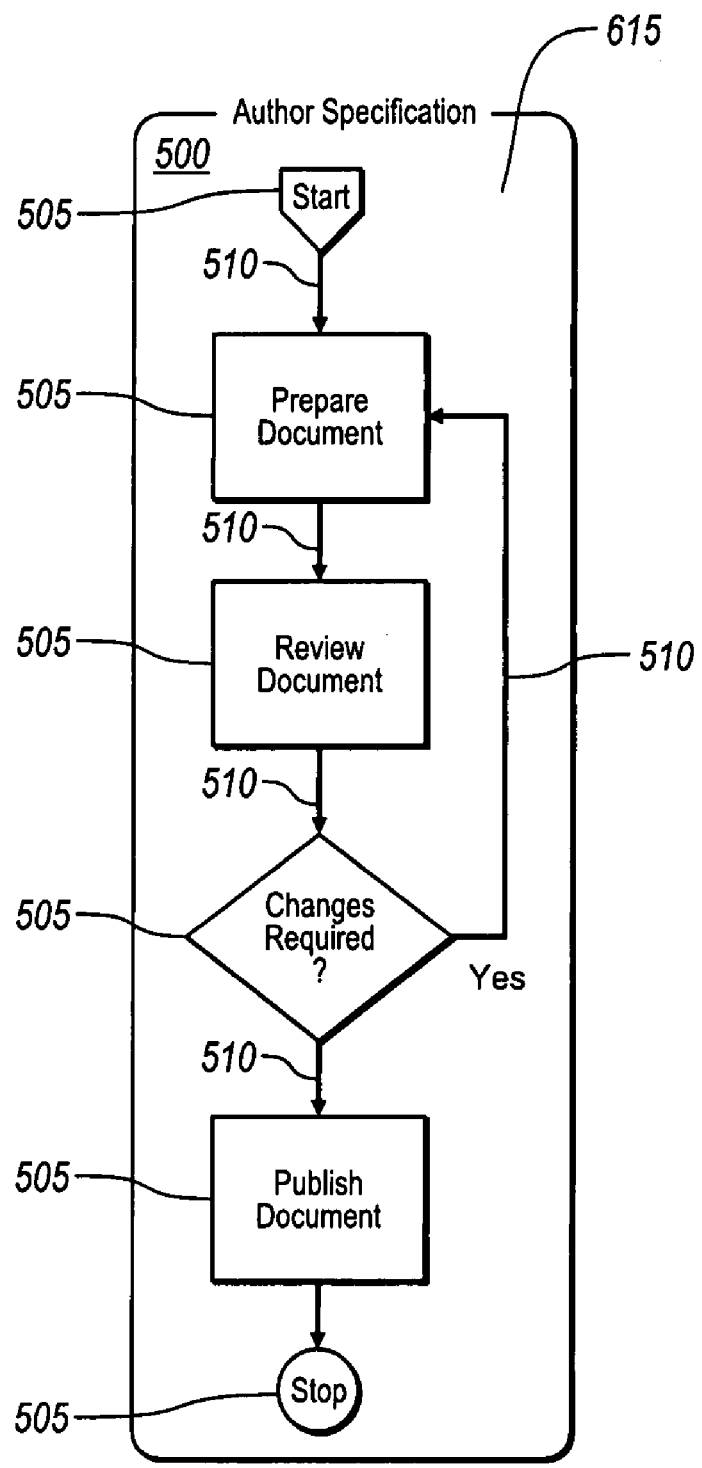
FIG. 5A illustrates a simplified business process for authoring a specification.

FIG. 5A illustrates an example instance of a business process domain for authoring a specification. More specifically, the business process of authoring the specification 500 starts and ends through the tasks of: preparing the document; reviewing the document; and then publishing the document. A decision branch is also used to determine if changes to one or more document reviews are necessary. Each activity 505 in the process 500 represents an individual repository software related item (e.g., object) and the start state and connections 510 show the relationships between those software related items.

Figure 5B:
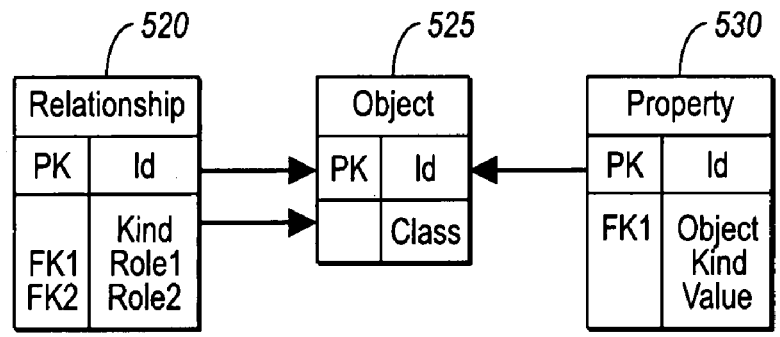
FIG. 5B illustrates an example table structure for the entity-property-value approach for organizing the business process of FIG. 5A.

FIG. 5B illustrates an example set of tables that implement the entity-property-value approach and the following tables show how the business process of

| Object | |
|---|---|
| Id | Kind |
| 1 | Business process |
| 2 | Start |
| 3 | Task |
| 4 | Task |
| 5 | Branch |
| 6 | Task |
| 7 | Stop |

| Property | | | |
|---|---|---|---|
| Id | Object | Kind | Value |
| i. | 1 | Name | Author Specification |
| ii. | 1 | Description | ... |
| iii. | 3 | Name | Prepare Document |
| iv. | 3 | Description | ... |
| v. | 4 | Name | Review Document |
| vi. | 4 | Description | ... |
| vii. | 5 | Condition | Changes Required |
| viii. | 6 | Name | Publish Document |
| ix. | 6 | Description | ... |

| Relationship | | | |
|---|---|---|---|
| Id | Kind | Role$_1$ | Role$_2$ |
| a | Start State | 1 | 2 |
| b | Next Activity | 2 | 3 |
| c | Next Activity | 3 | 4 |
| d | Next Activity | 5 | 3 |
| e | Next Activity | 4 | 5 |
| f | Next Activity | 5 | 6 |
| g | Next Activity | 6 | 7 |

FIG. 5A can be represented in those tables. Note that only three tables (i.e., Relationship 520, Object 525, and Property 530 tables) are needed to represent the entire domain. While this provides for a relatively lesser degree of engineering effort, as can be seen such tables require complex query structures for reflecting over the data stored.

Figure 5C:
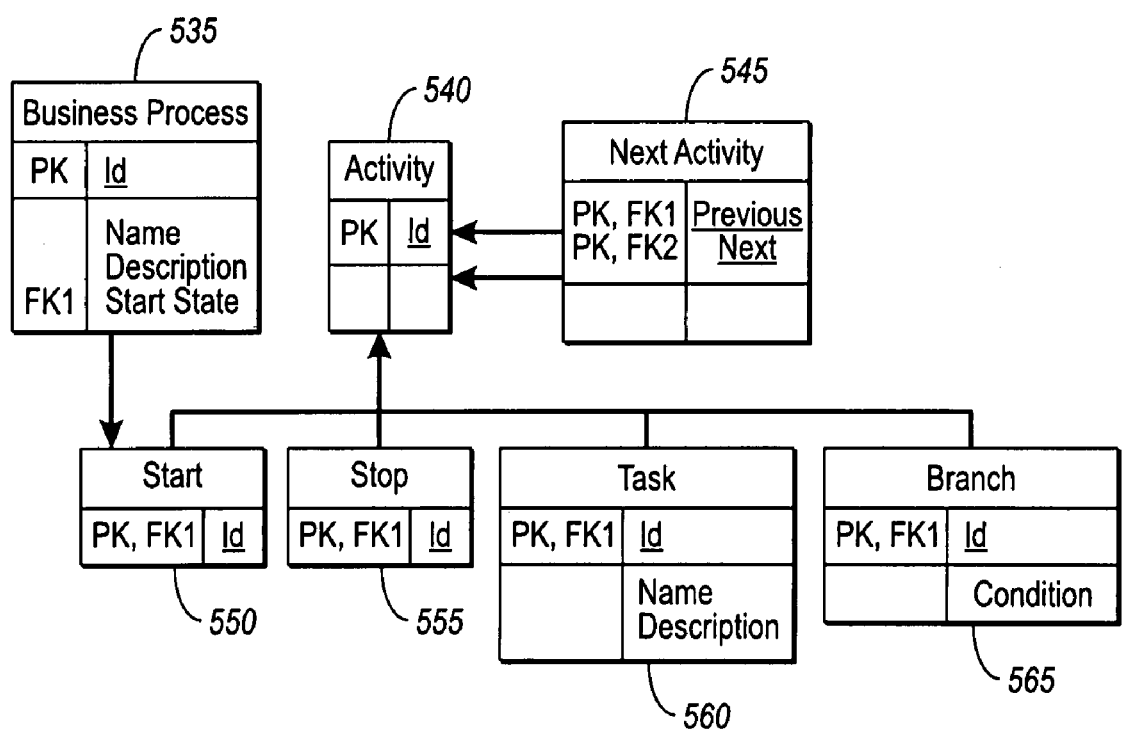
FIG. 5C illustrates an example table structure that utilizes the guidelines for making the tables more easily queriable in accordance with example embodiments.

In contrast, FIG. 5C illustrates an example of a set of tables showing how FIG. 5A might be represented in those tables using some of the above guidelines for creating the following pseudo tables. Note that the number of tables has

| Business Process | | |
|---|---|---|
| Id | Name | Description |
| 1 | Author Specification | ... |

| Activity |
|---|
| Id |
| 2 |
| 3 |
| 4 |
| 5 |
| 6 |
| 7 |

| Start |
|---|
| Id |
| 2 |

| Stop |
|---|
| Id |
| 7 |

| Task | | |
|---|---|---|
| Id | Name | Description |
| 3 | Prepare Document | ... |
| 4 | Review Document | ... |
| 6 | Publish Document | ... |

| Branch | |
|---|---|
| Id | Condition |
| 5 | Changes Required | significantly increased (i.e., Business Process 535, Activity 540, next activity, 545, Start 550, Stop, 555, Task 560, and Branch 565 tables), which requires a greater amount of engineering effort, but the result is a much higher overall usability and performance.

Container Description

Figure 1B:
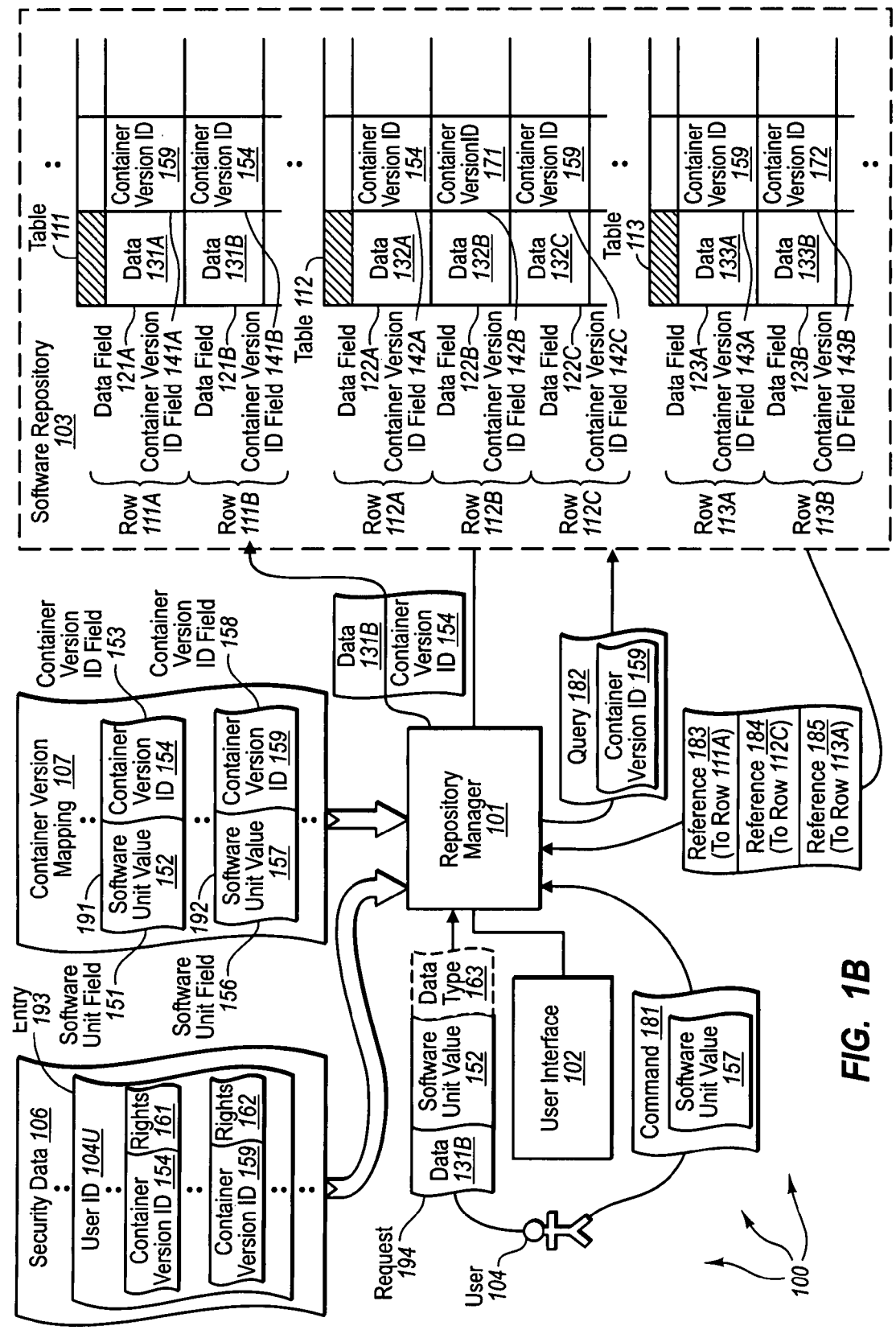
FIG. 1B illustrates an example computer architecture that facilitates software repositories.

FIG. 1B illustrates an example computer architecture 100 that facilitates software repositories. As depicted computer architecture 100 includes repository manager 101, user-interface 102, software repository 103, security data 106, and container version mapping 107. Repository manager 101, user-interface 102, software repository 103, security data 106, and container version mapping 107 can be connected to a network, which can be virtually any network or combination thereof, such as, for example, a Local Area Network ("LAN"), a Wide Area Network ("WAN"), and even the Internet. Thus, repository manager 101, user-interface 102, and software repository 103, as well as any other connected components and computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. Accordingly, data stored software repository 103, security data 106, and container version mapping 107 can be accessed and manipulated through the exchange of network message related data over the network.

User-interface 102 is configured to receive user entered input requests and commands for accessing and/or manipulating data (e.g., software related items) stored in software repository 103. User-interface 102 is also configured to receive user entered input requests and commands for accessing and/or manipulating the data structures (e.g., tables) used to store data in software repository 103. User-interface 102 is also configured to present results corresponding to user entered requests and commands back to a user.

Generally, software repository 103 is configured to store software related items, such as, for example, metadata, for a plurality of software units. Metadata can describe the structure of software components, the behavior of software components, and other characteristics useful for organization and control of software components. A software unit can be an application (e.g., a word processor or electronic mail client), a framework (e.g., a development framework), a service (e.g., a web service or other mechanism for sharing business logic), or some other aggregation of interoperating software components that perform one or more functions.

A software unit can be user-defined based on a user's desire to group specified software related items together and/or separate specified software related items from one another. For example, a user (administrator or operations staff) can divide software repository 103 into a plurality of different software units based on security criteria, data access patterns, replication criteria, scalability criteria, versioning criteria, subjective criteria the administrator believes to be relevant, or some combination thereof, with respect to software related item data stored in software repository 103.

Generally, container version mapping 107 is configured to map a software unit to a container version ID. The container version ID corresponds to a repository container version that logically stores software related item data that has been grouped into the software unit. Repository container versions can be configured in a variety of different ways to group software related item data together for a software unit.

In some embodiments, for each software unit, container version mapping 107 can include a software unit field storing a software unit value that identifies a software unit. For example, software unit indicator 191 includes software unit field 151 storing software unit value 152 and corresponds to a software unit. A software unit value can be a friendly name for the software unit, such as, for example, "Development Framework A, Version 1.7".

In these embodiments, for each software unit, container version mapping 107 can also include a container version ID field storing a container version identifier value. The container version identifier value can be used within software repository 103 to identify a repository container version mapped to a software unit identified by the software unit value stored in the software unit field. For example, software unit indicator 191 includes container version ID field 153 storing container version ID 154. Container version ID 154 can be used within software repository 103 to identify a repository container version mapped to software unit indicator 191.

In some embodiments, software related items are stored within software repository 103 in tables by item type. For example, there can be one table storing software related items for classes (e.g., table 111), another table storing software related items for methods (e.g., table 112), yet another table storing software related items for interfaces (e.g., table 113), etc. Tables can include a plurality of rows. For example, table 111 includes at least rows 111A and 111B, tables 112 includes at least rows 112A, 112B, and 112C, and table 113 includes at least rows 113A and 113B.

In these embodiments, each row includes a software related item data field (e.g., in a software related item data column) storing software related data. For example, rows 111A and 111B include data fields 121A and 121B storing software data related data 131A and 131B respectively. Rows 112A, 112B, and 112C include data fields 122A, 122B, and 122C storing software related data 132A, 132B, and 132C respectively. Rows 113A and 113B include data fields 123A and 123B storing software related data 133A and 133B respectively.

Also in these embodiments, each row includes a container version ID field (e.g., in a container version ID column) storing a container version ID value from a container version mapping for a software unit. The container version ID value designates that the software related data stored in the software related item data field corresponds to a repository container version that is mapped to the software unit. For example, rows 111A and 111B includes container version ID fields 141A and 141B storing container IDs 159 and 154 respectively. Rows 112A, 112B, and 112C include container version ID fields 142A, 142B, and 142C storing version container IDs 154, 171, and 159 respectively. Rows 113A and 113B include container version ID fields 143A and 143B storing container version IDs 159 and 172 respectively.

Container version ID fields that store container version ID 154 designate that software related item data in the same row corresponds to a repository container version that is mapped to software unit indicator 191. For example, container version ID value 154 stored in container version ID filed 142A designates that data 142A corresponds to a repository container version mapped to software unit indicator 191. Container version ID fields that store version container ID 159 designate that software related item data in the same row corresponds to a repository container version that is mapped to software unit indicator 192. For example, container version ID value 159 stored in container version ID field 141A designates that data 131A corresponds to a repository container version mapped to software unit indicator 192. Other container version IDs, such as, for example, container version IDs 171 and 172, can designate that software related item data corresponds to repository container versions mapped to other software units not expressly depicted in container version mapping 107.

Figure 2:
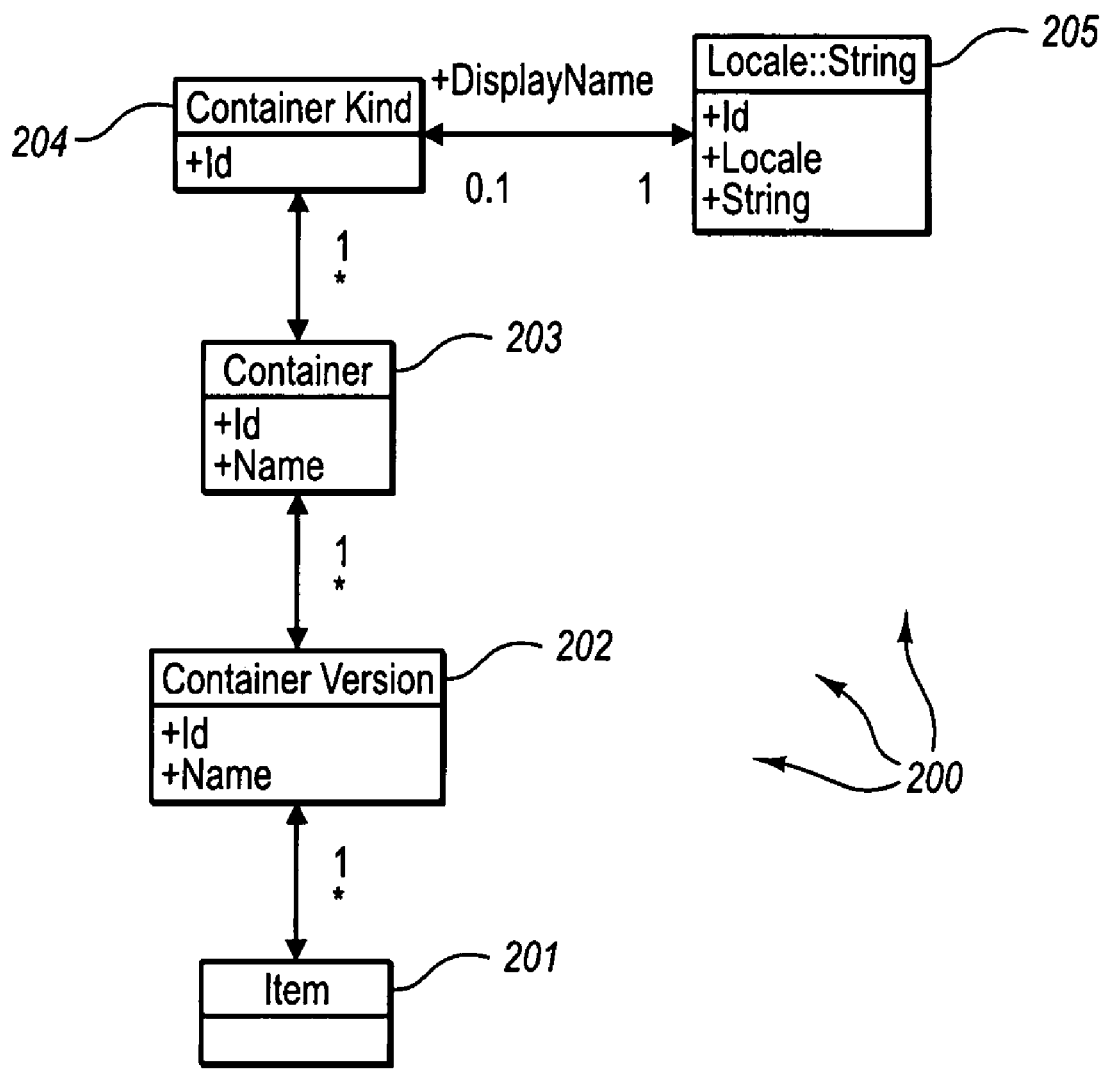
FIG. 2 illustrates an example relationship between repository containers and repository items.

The relationship between repository containers and repository items can be established and maintained in a variety of different ways. Referring now to FIG. 2, FIG. 2 illustrates an example relationship 200 between repository containers and repository items. As depicted, Container Kind 204 defines a specified kind of container, such as, for example, a container for software related items corresponding to an application, a framework, or a service. Each kind of container can be given an identifier and a string-based display name as defined by 205.

Container 203 is defined as of the type Container Kind 204 and includes and ID and name. For example, container 203 can be of the type application container kind to store software related items for a set of software components comprising a Word Processing Application.

Containers can also be versioned to account for evolving systems. Thus, container version 202 is defined as of the type of container 203 for a specified version of software components. For example, container version 202 can define a first instance of the Word Processing Application container corresponding to software components comprising Word Processing Application, Version 1.0 and a second separate instance of the Word Processing Application container corresponding software components comprising Word Processing Application, Version 2.0. However, the relationship between a container's versions is not prescribed and users can structure container versions in arbitrary ways. For example, container versions can have a linear structure or a tree structure.

Item 201 defines that an item can be stored in a container version. In some embodiments, each software related item is stored in exactly one container version. Accordingly, in these embodiments, each software related item in software repository 103 corresponds to exactly one container version ID, wherein the container version ID is used to identify a repository container version of a container that is in a family of containers defined by a container kind (204), a set of software components (203), and version of those software components (202).

Container version versions form a natural unit of security in a software repository. Since container versions are a natural unit of aggregation in the software repository and all repository items belong to exactly one container version, securing repository items at the level of container versions results in a relatively simple security model. Through the security model, repository administrators are able to grant individual users read or update permission on individual container versions. Because repository users can choose their container models to match the desired security granularity, the security model has inherent flexibility.

Referring back to FIG. 1B, generally, security data 106 is configured to reflect users' rights to repository containers version. Security data 106 includes a list of entries, such as, for example, entry 193, that identify a user ID and the rights the user ID has to software related item data designated as corresponding to a specified repository container version. Each user ID can correspond to a set of credentials for a specified user. For example, user ID 104U can correspond to credentials for user 104. Thus, any user that authenticates with credentials for user ID 104U is given rights that have been granted to user 104.

Each entry can include a list of container version IDs and the rights granted (or denied) to software related item data for the repository container version corresponding to the container version ID. For example, entry 193 indicates that user ID 104U has been granted (or denied) rights 161 to the repository container version corresponding to container version ID 154. Similarly, entry 193 indicates that user ID 104U has been granted (or denied) rights 162 to the repository container version corresponding to container version ID 159. Granted or denied rights can include rights to create, read, write, delete, or enumerate software related item data in a software repository version. Granted or denied rights can also include rights to create, read, write, delete, or enumerate data structures (e.g., tables) used to store software related item data in a software repository.

Generally, repository manager 101 is configured to manage access to software related item data stored in software repository 103 and to manage access to data structures (e.g., tables) used to store software related item data in software repository 103. Repository manager 101 can include the functionality to implement any specified operations which a user has been granted rights to perform.

From time to time, repository manager can receive user requests related to data in a software unit. Repository manager 101 can refer to container version mapping 107 to identify the container version ID corresponding to the software unit. In accordance with the security model, repository manager 101 can then access an entry from security data 106 that corresponds to the user's user ID. Repository manager 101 can use the entry to determine if the user ID has rights to perform the user request with the repository container version corresponding to the user ID.

For example, repository manager 101 can receive a request from user 104 requesting performance of an operation in the repository container version corresponding to container version ID 154. In response, repository manager 101 can access entry 193. Repository manager 101 can refer to rights 161 to determine if user 104 is permitted to perform the requested operation.

Method Descriptions

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 3, 4, and 6—is used to indicate the desired specific use of such terms.

Figure 3:
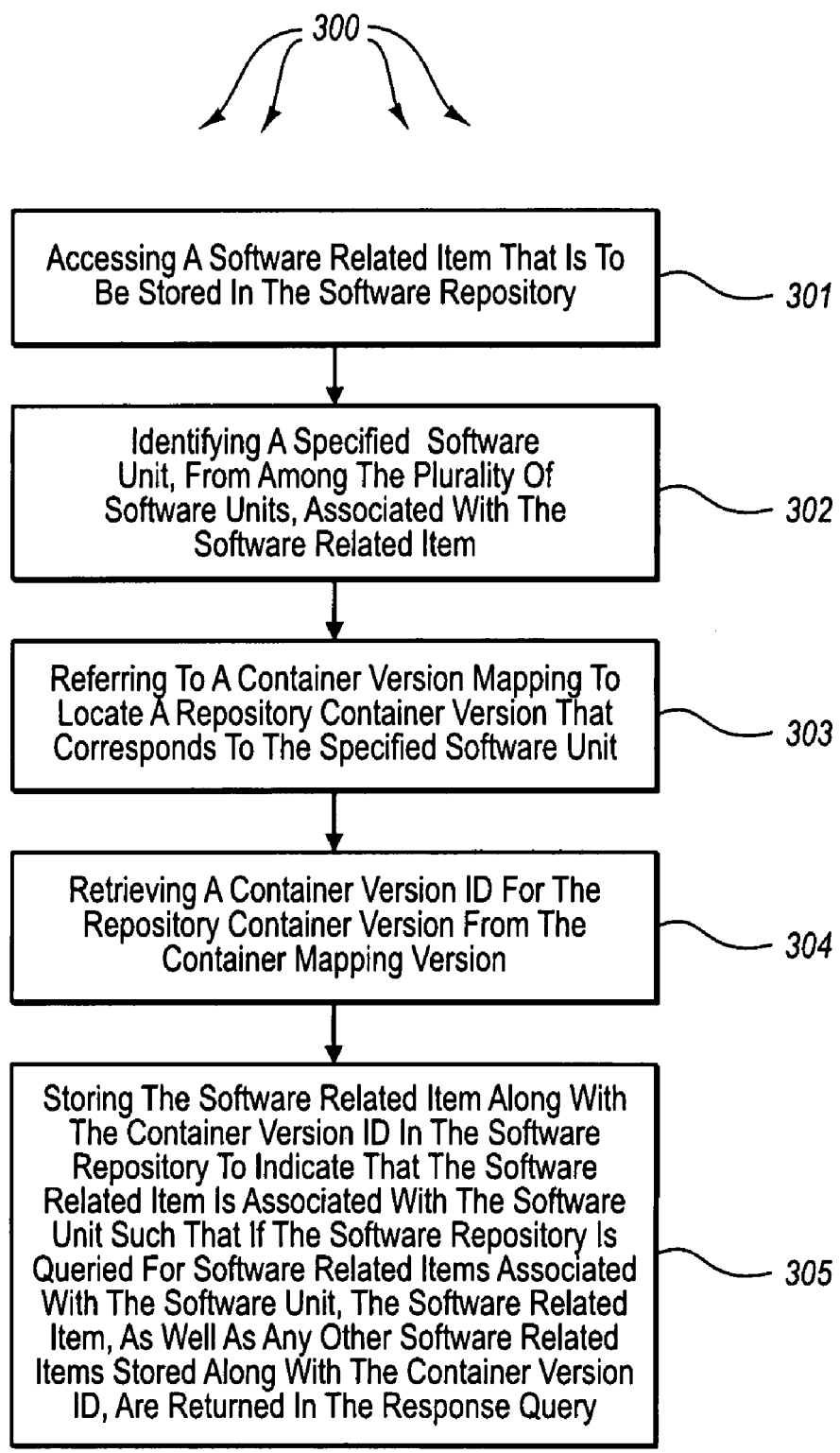
FIG. 3 illustrates a flowchart of a method for storing a software related item in a software repository in a manner that indicates the software related item is associated with a specified software unit.
Figure 4:
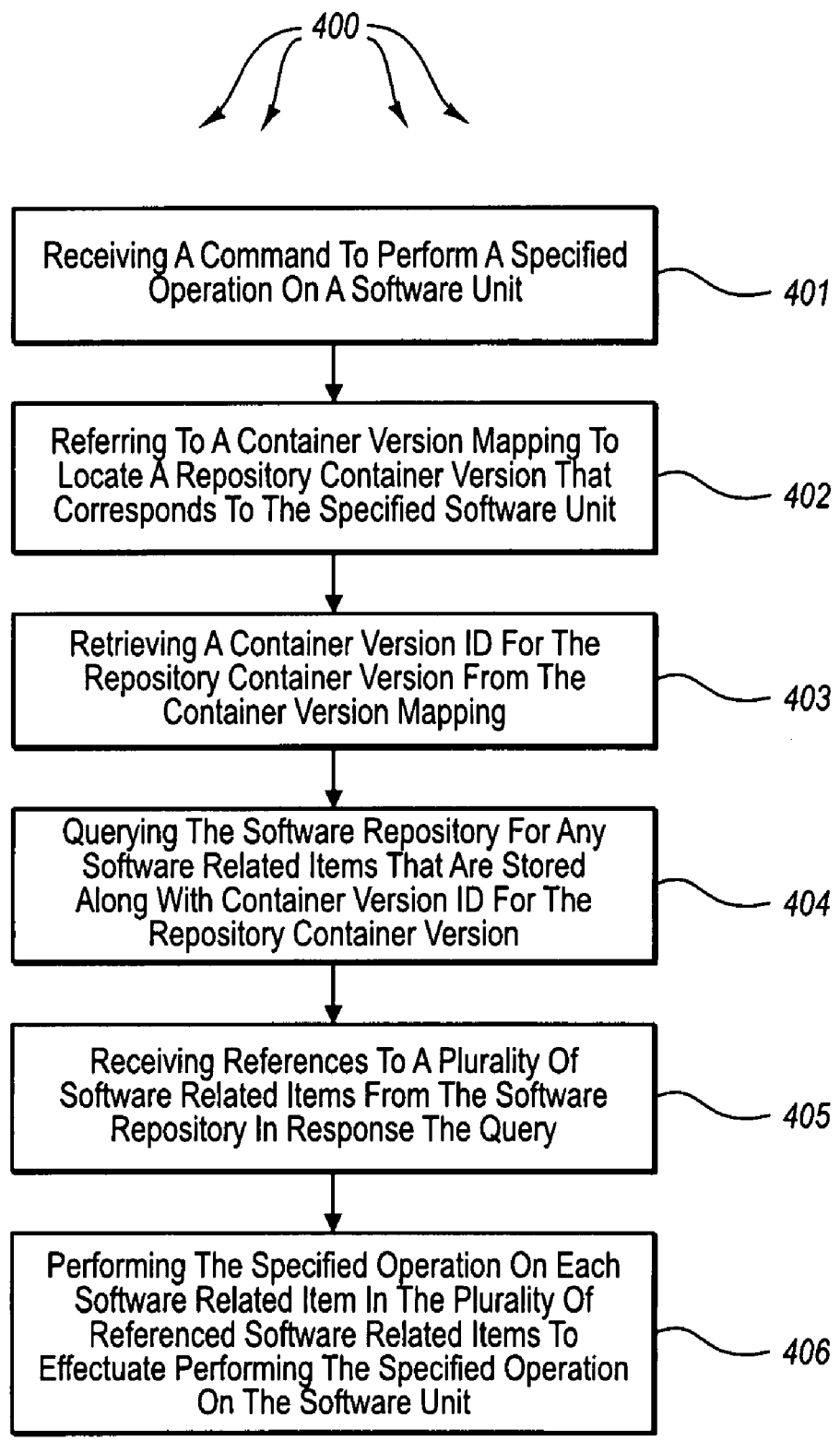
FIG. 4 illustrates a flowchart of a method for performing an operation for a specified software unit.
Figure 6:
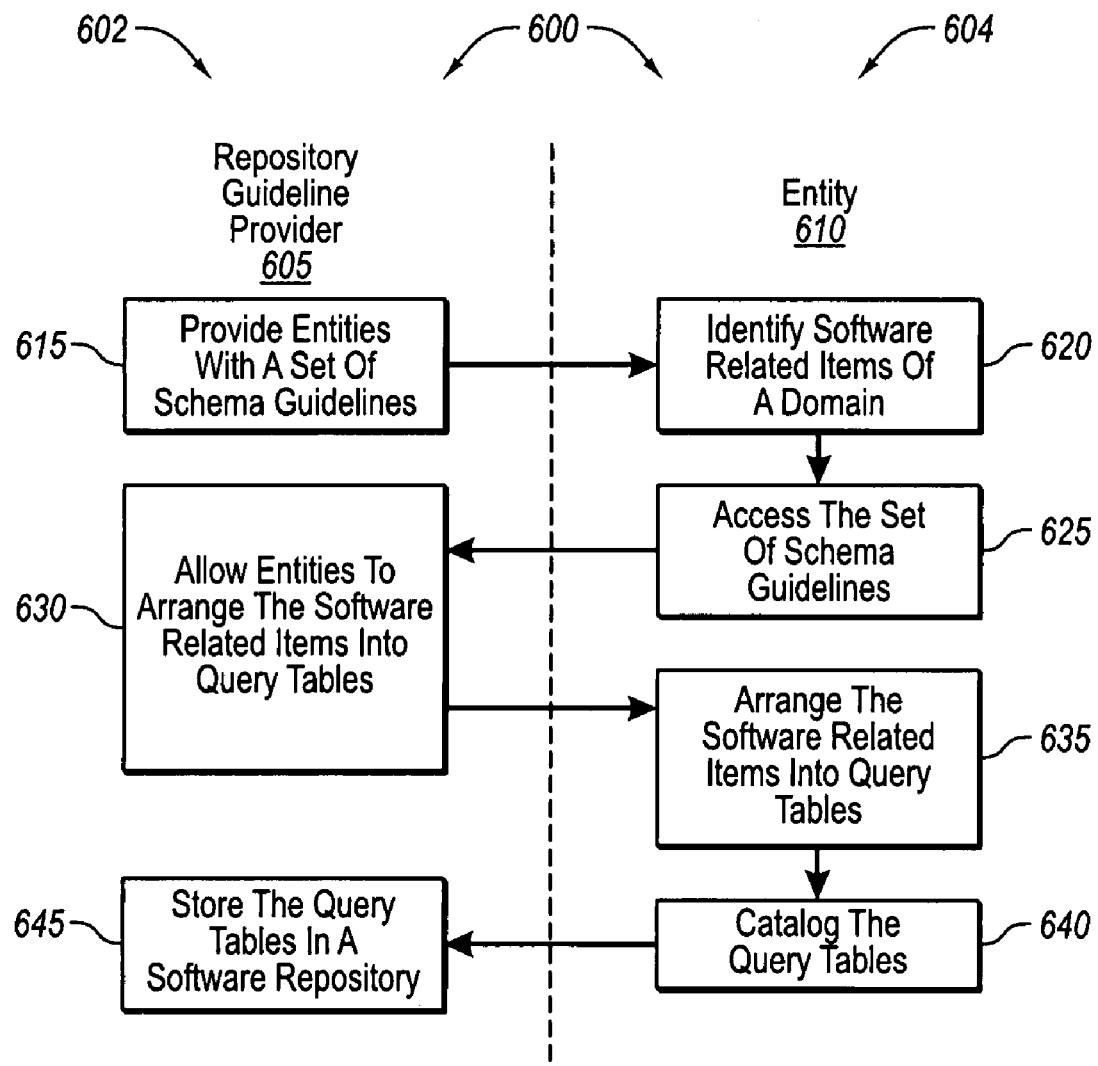
FIG. 6 illustrates both a method of providing and a method of using guidelines to optimally create, manage, and/or store software related items in a way that allows rich querying in accordance with example embodiments.

As previously mentioned, FIGS. 3, 4, and 6 illustrate flow diagrams for various exemplary embodiments of the present invention. The following description of FIGS. 3, 4, and 6 will occasionally refer to corresponding elements from FIGS. 1A, 1B, and 2. Although reference may be made to a specific element from these Figures, such references are used for illustrative purposes only and are not meant to limit or otherwise narrow the scope of the described embodiments unless explicitly claimed.

FIG. 6 illustrates flowcharts for repository environment 600 with both a repository guideline provider side 602 and a entity side 604. Accordingly, FIG. 6 illustrates flowcharts for both a method 605 of providing guidelines and a method 610 of using those same guidelines to create, manage, and/or store fine-grained metadata, artifacts, or other software related items of a domain. Note that the guidelines provide a relational model that stores these items in a way that allows rich querying using standard database routines and other tools.

Starting from the guideline provider side 602, method 605 includes an act of providing 615 entities with a set of schema guidelines. For example, guidelines 145 can be provided to entities 140, which represent developers, applications, or others. Note that these guidelines describe how software related items of a schematized model of a domain are to be categorized in query tables 125.

On the entity side 604, method 610 includes an act of identifying 620 software related items. For example, entities 140 may identify software related items of a schematized model of a domain. The items may be identified in source stores 135 or from other sources. Method 610 then includes an act of accessing 625 the set of schema guidelines. For example, similar to above, entities 140 can access the guidelines 145, which describe how the software related times are to be categorized in query tables 125.

In one embodiment that the guidelines may include such things as: naming guidelines; script file guidelines; schema guidelines; table guidelines; indexing guidelines; viewing guidelines; procedure and function guidelines; foreign key guidelines; query guidelines; or cursor use guidelines. For example, the naming guidelines may include: using lowercase characters for T-SQL keywords; quoting identifiers with [ . . . ] style quotes; using schema qualified names to refer to database objects; using .Net naming conventions; using [Id] as the name of the primary key; using plurals for table and view names; appending Table to repository item table names; using singular role names for join columns; using singular schema names; explicitly naming constraints; or using separate schema for each domain.

In another embodiment, the naming guidelines further include: using [PK_TableName] for primary-key names; using [Check_TableName_Column1_Column2_Description] for check constraint names; using [Unique_TableName_KeyColumn1_KeyColumn2] for unique constraint names; using [FK_SourceTable_Source-Column_TargetTableName] for foreign key names: using [IR_KeyColumn1_KeyColumn2_LeafColumn1] for relational index names; using [IX_Column_Kind] for XML index names where Kind is one of: Primary, Value, Path or Property; or using [Schema_Area] for full-text index catalog names.

In still other embodiments, the script file guidelines include using two script files per domain. In other embodiments the schema guidelines include using extended properties to copyright and conversion table domains/schema. In yet another embodiment, the table guidelines may include: using normalized table designs; explicitly naming primary keys, foreign keys, or indexes; using surrogate keys; using a big or large integer type for identity columns of the software related items where an ID will vary across instances thereof; using a unique identifier type ID columns of repository items where the ID does not vary across repository instances; vertically partitioning large or infrequent accessed columns into separate tables; using explicit integrity constraints; using XML columns based on a schema collection for hierarchical or ordered data that will be fetched as a unit; adding a container version column to each domain table; adding a tombstone table and associated delete trigger for each domain table; using a xml: lang attribute for XML entities including culture specific content; avoiding using string types for enumerations; storing locale specific text as references to a table and retrieve the strings with a scalar function; or not using text, ntext, or image column types; restricting access to base tables to the loginless users.

In a related embodiment, the index guidelines include: indexing join columns; indexing foreign key columns; indexing columns that frequently appear in where clauses; adding leaf columns to indexes; not using index columns with a small number of distinct values; creating a new full-text catalog for each group of related values; not using schema binding; or creating security views. Other embodiments provide that the procedure and function guidelines include: using updatable view instead of basic database functions; not using schema binding; avoiding cursors; not allowing for change of primary key columns; not altering identity or timestamp columns; or using column lists in insert statements. In another embodiment, one or more of the following may apply: (1) foreign key guidelines include using delete triggers to enforce non-primary cascade delete actions; (2) the query guidelines include using table aliases composed of the initial capital letters in the table's name; or (3) wherein the cursor use guidelines include avoiding the user of cursors, or if cursors are used, using a standard pattern for cursors.

Returning to the guideline provider side 602 of repository system 600, based on the set of schema guidelines, method 605 further includes an act of allowing 630 entities to arrange the software related items into query tables. Similarly, on the entity side 604, method 610 includes an act of arranging 635 the software related items into query tables based on the schema guidelines. For example, entities 140 can use the guidelines 145 to arrange the software related items into query tables 125, which provide ease in querying over the software related items. Note that such software related items typically reside in a universal entity-property-value schema that is versioned on an object-by-object basis. By contrast, embodiments herein provide that the query tables 125 may be versioned on the basis of a collection of software related items in one or more containers that have changed since a last versioning. In addition, these containers may be loosely coupled by soft links that represent a relationship between two fine-grained software items. For example, the containers may be different versions of software items and the soft link can then be used at query or runtime to determine the appropriate version.

Method 610 further includes an act of cataloging 640 the query tables. Similarly, on the guideline provider side 602, method 605 includes an act of storing 645 the query tables in a software repository. For example, query tables 125 may be cataloged in source stores 135 and subsequently stored in queriable repository 120 for rich querying using standard database routines by tools 115, users 105 with repository browser 110, or even runtime executables 150. Further note that the software related items can also be cataloged and stored in the queriable repository using the universal entity-property-value schema 130, which can also be served up to one or more applications as necessary.

FIG. 3 illustrates a flowchart of a method 300 for storing a software related item in a software repository in a manner that indicates the software related item is associated with a deployable software unit. Method 300 will be described with respect to the components and data in computer architecture 100.

Method 300 includes an act of accessing a software related item that is to be stored in the software repository (act 301). For example, a user can enter input data for formulating request 194 at user interface 102. User interface 102 can formulate request 194 from the input data and send request 194 to repository manager 101. Repository manager 101 can receive request 194 from user interface 102. Request 194 includes data 131B (e.g., a software related item), software unit value 152, and can optionally include data type 163. Data type 163 can indicate the type of software component, such as, for example, class, method, interface, etc. that data 131B relates to.

Method 300 includes an act of identifying a specified software unit, from among the plurality of software units, associated with the software related item (act 302). For example, repository manager 101 can identify software unit indicator 191 from software unit value 152.

Method 300 includes an act of referring to a container version mapping to locate a repository container version that corresponds to the specified deployable software unit (act 303). For example, based on software unit value 152, repository manager 101 can refer to container version mapping 107 to locate a repository container version that corresponds to software unit indicator 191. Method 300 includes an act of retrieving a container version ID for the repository container version from the container version mapping (act 304). For example, repository manager 101 can retrieve container version ID 154 from container version mapping 107.

When appropriate, repository manager 101 can refer to security data 106 prior to implementing act 305. Repository manager 101 can access entry 193 to determine that user 104 has sufficient rights to store software related item data in the repository container version identified by container version ID 154.

Method 300 includes an act of storing the software related item along with the container version ID in the software repository to indicate that the software related item is associated with the software unit (act 305). Accordingly, if the software repository is queried for software related items associated with the software unit, the software related item, as well as any other software related items stored along with the container version ID, are returned in response to the query. For example, repository manager 101 can store data 131B in data field 121B and store container version ID 154 in container ID field 141 to designate that data 131 is associated with software unit indicator 191. Repository manager 101 can store data 131B and container version ID 154 in table 111 based on data type 163 corresponding to table 111. When appropriate, for example, when request 194 does not include data type 163, repository manager 101 can determine the data type of data 131B based on the contents of data 131B. Thus, when software repository 103 is queried for software related items associated with software unit indicator 191, data 131, as well as other data stored along with container version ID 154, are returned in response to the query.

Repository manager 101 can return any results for request 194 to user interface 102. User interface 102 can display the results to user 104.

FIG. 4 illustrates a flowchart of a method 400 for performing an operation for a specified software unit. Method 400 will be described with respect to the components and data in computer architecture 100.

Method 400 includes an act of receiving a command to perform a specified operation on a software unit (act 401). For example, a user can enter input data for formulating command 181 at user interface 102. User interface 102 can formulate command 181 to include software unit value 157 from the input data and send command 181 to repository manager 101. Repository manager 101 can receive command 181 from user interface 102. Command 181 can be a command to replicate, partition, etc., the software unit. For example, it may be that the software unit is frequently accessed and a user desires to partition the software unit onto a disk drive having reduced access times.

Method 400 includes an act of referring to a container version mapping to locate a repository container version that corresponds to the software unit (act 402). For example, based on software unit value 157, repository manager 101 can refer to container version mapping 107 to locate a repository container version that corresponds to software unit indicator 192. Method 400 includes an act of retrieving a container version ID for the repository version container from the container version mapping (act 403). For example, repository manager 101 can retrieve container version ID 157 from container version mapping 107.

When appropriate, repository manager 101 can refer to security data 106 prior to implementing act 304. Repository manager 101 can access entry 193 to determine that user 104 has sufficient rights to perform the operation indicated in command 101 in the repository container version identified by container version ID 154. A user may be required to have a combination of rights to perform an operation. For example, to replicate software related item data in a repository, a user may be required to have both read and write access to the repository container version.

Method 400 includes an act of querying the software repository for any software related items that are stored along with container version ID for the repository container version (act 404). For example, repository manager 101 can issue query 182 to software repository 103 for any software related item data stored along with container version ID 159. Method 400 includes an act of receiving references to a plurality of software related items from the software repository in response the query (act 405). For example, repository manager 101 can receive references 183 (to row 111A), 184 (to row 112C), and 185 (to row 113A) from software repository 103 in response to query 182.

Method 400 includes an act of performing the specified operation on each software related item in the plurality of referenced software related items to effectuate performing the specified operation on the software unit (act 406). For example, repository manager 101 can perform the specified operation on data 131A, 132C, and 133A (on all the data in rows 111A, 112C, and 113A) to effectuate performing the specified operation on the software unit corresponding to software unit indicator 191. Thus, repository manager 101 can replicate or partition all the software related items designated as being in a repository container version to effectuate replicating or partitioning the repository container version.

Repository manager 101 can return any results for command 181 to user interface 102. User interface 102 can display the results to user 104.

In some embodiments, there are also relationships between items across container version boundaries. Relationships across container version boundaries can be computed based on domain specific resolution rules (e.g., CLR linking rules). Thus, domains can reuse domain specific mechanisms used to resolve references across versions.

Soft links (late binding links) provide a name based mechanism for referencing repository items that are resolved, by providers, at traversal time and may not refer to any actual repository item. Soft links may refer to repository items in other repositories either by explicitly identifying the repository or by giving a list of repositories. Domain implementers provide routines that given a soft link return the corresponding repository item. Source models are free to store soft links in an arbitrary way as long as they can generate a soft link to pass to the corresponding routine. Soft links can be stored implicitly and constructed at query time.

Since databases can store typed XML in a compact binary format, soft links can be stored efficiently and domains can also construct them from other data and a suitable context. Server names or addresses can be used in environments where some software repository items are kept locally and other software repository items are infrequently accessed from other repositories. For example, in a geo-scaled scenario a individual server in, Japan can map to the Corp. role for departmental repositories in East Asia and a server in the United States would can map to the Corp. role for departmental repositories in the Americas.

Domains can supply table valued functions following the naming scheme [Domain].[ResoveItemTypeLink] that resolve soft links to repository items. Given a soft link, a soft link resolution function will return the corresponding item (or if no item was found then no row). In some cases a resolution procedure may allow ambiguous names and return multiple rows.

The helper function [Item].[LinkContainerVersion] takes a soft link and returns the ID of the container version the soft link refers to. The helper function [Item].[LinkServerRoles] takes a soft link and returns an ordered list of linked servers to query. The helper function [Item].[CreateLink] takes soft link version information, the container version and the path and returns a soft link of the appropriate version. Factoring the link API this way improves performance because each soft link resolution function will have a known result type, less dynamic code is involved and network traffic is reduced where the target repository is known ahead of time Accordingly, embodiments of the present invention permit a user to group software related items from a software repository such that the software related items can be accessed and processed together. A user has wide discretion on how software related items are to be grouped such that repository containers version are configured for efficient use in a particular environment. In some embodiments, software related items are grouped in the same repository container version based on component versions such that all the software related items for a specified version of an application, framework, or service can be accessed and processed together. Accordingly, an operation can be performed on all the software related items in the repository container version to effectuate performing the operation on the specified version of the application, framework, or service.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a repository environment, a method of providing entities the ability to create, manage, and/or store fine-grained metadata, artifacts, or other software related items of a domain by providing a relational model that stores these items in a way that allows rich querying using database routines and other tools, the method comprising:

exposing, via an interface stored in memory of a computer system a set of schema guidelines that describe how software related items of a schematized model of a domain are to be categorized in query tables of a repository, the software related items including both executables and metadata that describes the executables, wherein the set of schema guidelines includes two or more of: naming guidelines; script file guidelines; table guidelines; indexing guidelines; viewing guidelines; procedure and function guidelines; foreign key guidelines; query guidelines; or cursor use guidelines;

receiving from one or more entities software related items that are organized according to one or more schema guidelines in the set of schema guidelines, the software related items being received by the repository; and storing the organized software related items into a plurality of query tables of the repository, wherein the organized software related items are stored in rows of the query tables, wherein each row includes a container version ID field storing a container version ID that identifies a container to which the organized software related items stored in the row pertain, and wherein the containers are versioned based on when changes to the organized software related items the containers contain are made.

2. The method of claim 1, wherein a plurality of the containers are further loosely coupled by one or more soft links that represents a relationship between two fine-grained software items.

3. The method of claim 2, wherein the plurality of the containers are different versions of the software related items and the soft link is used to determine the appropriate version at query time.

4. The method of claim 1, wherein the naming guidelines include one or more of: using lower-case characters for T-SQL keywords; quoting identifiers with [ . . . ] style quotes; using schema qualified names to refer to database objects; using .Net naming conventions; using [Id] as the name of a primary key; using plurals for table and view names; appending Table to repository item table names; using singular role names for join columns; using singular schema names; explicitly naming constraints; or using separate schema for each domain.

5. The method of claim 4, wherein the naming guidelines further include one or more of: using [PK_TableName] for primary-key names; using [Check_TableName_Column1_Column2_Description] for check constraint names; using [Unique_TableName_KeyColumn1_KeyColumn2] for unique constraint names; using [FK_SourceTable_SourceColumn_TargetTableName] for foreign key names: using [IR_KeyColumn1_KeyColumn2_LeafColumn1] for relational index names; using [IX_Column_Kind] for XML index names where Kind is one of: Primary, Value, Path or Property; or using [Schema_Area] for full-text index catalog names.

6. The method of claim 1, wherein the script file guidelines include using two script files per domain.

7. The method of claim 1, wherein the schema guidelines include using extended properties to copyright and conversion table domains or schema.

8. The method of claim 1, wherein the table guidelines include one or more of: using normalized table designs; explicitly naming primary keys, foreign keys, or indexes; using surrogate keys; using a big or large integer type for identity columns of the software related items where an ID will vary across instances thereof; using a unique identifier type ID columns of repository items where the ID does not vary across repository instances; vertically partitioning large or infrequent accessed columns into separate tables; using explicit integrity constraints; using XML columns based on a schema collection for hierarchical or ordered data that will be fetched as a unit; adding a container version column to each domain table; adding a tombstone table and associated delete trigger for each domain table; using a xml:lang attribute for XML entities including culture specific content; avoiding using string types for enumerations; storing locale specific text as references to a table and retrieve the strings with a scalar function; or do not use text, ntext, or image column types; restricting access to base tables to the login less users.

9. The method of claim 1, wherein the index guidelines include one or more of: indexing join columns; indexing foreign key columns; indexing columns that appear in where clauses; adding leaf columns to indexes; not using index columns with a small number of distinct values; creating a new full-text catalog for each group of related values; not using schema binding; or creating security views.

10. The method of claim 1, wherein the procedure and function guidelines include one or more of: using updatable view instead of basic database functions; not using schema binding; avoiding cursors; not allowing for change of primary key columns; not altering identity or timestamp columns; or using column lists in insert statements.

11. The method of claim 1, further comprising one or more of the following: wherein foreign key guidelines include using delete triggers to enforce non-primary cascade delete actions; wherein the query guidelines include using table aliases composed of the initial capital letters in the table's name; or wherein the cursor use guidelines include avoiding the user of cursors, or if cursors are used, using a standard pattern for cursors.

12. The method of claim 1, further comprising:
    storing the plurality of software related items in the software repository using a universal entity-property-value schema; and
    upon receiving a request to process an application associated with the domain, retrieving the plurality of software related items using the universal entity-property-value schema.

13. One or more computer readable storage media storing computer executable instructions which when executed by a processor in a computer system perform a method of creating, managing, and/or storing fine-grained metadata, artifacts, or other software related items of a domain by providing a relational model that stores these items in a way that allows rich querying using database routines and other tools, the method comprising:
    exposing, via an interface stored in memory of a computer system a set of schema guidelines that describe how software related items of a schematized model of a domain are to be categorized in query tables, the software related items including both executables and metadata that describes the executables, wherein the set of schema guidelines includes two or more of: naming guidelines; script file guidelines; table guidelines; indexing guidelines; viewing guidelines; procedure and function guidelines; foreign key guidelines; query guidelines; or cursor use guidelines;
    receiving from one or more entities software related items that are organized according to one or more schema guidelines in the set of schema guidelines, the software related items being received by the repository; and
    storing the organized software related items into a plurality of query tables of the repository, wherein the organized software related items are stored in rows of the query tables, wherein each row includes a container version ID field storing a container version ID that identifies a container to which the organized software related items stored in the row pertain, and wherein the containers are versioned based on when changes to the organized software related items the containers contain are made.

14. The one or more computer readable storage media of claim 13, wherein a plurality of the containers are further loosely coupled by one or more soft links that represents a relationship between two fine-grained software items.

15. The one or more computer readable storage media of claim 14, wherein the plurality of the containers are different versions of the software related items and the soft link is used to determine the appropriate version at query time.

16. The one or more computer readable storage media of claim 13, further comprising:
    storing the plurality of software related items in the software repository using a universal entity-property-value schema; and
    upon sending a request to process an application associated with the domain, receiving the plurality of software related items using the universal entity-property-value schema.

* * * * *